United States Patent
Roese

[11] Patent Number: 5,868,407
[45] Date of Patent: Feb. 9, 1999

[54] STEERABLE CART WITH HAND BRAKE

[76] Inventor: William C. Roese, 4285 S. Two-Mile Rd., Bay City, Mich. 48706

[21] Appl. No.: 704,229

[22] Filed: Aug. 27, 1996

[51] Int. Cl.$^6$ ....................................................... B62B 3/00
[52] U.S. Cl. .................................. 280/47.371; 280/47.34
[58] Field of Search ........................... 280/47.34, 47.371; 188/2 R, 29, 119, 19, 192, 31; 16/35 R; 410/80

[56] References Cited

U.S. PATENT DOCUMENTS

| | | |
|---|---|---|
| 1,876,788 | 9/1932 | Tarrant . |
| 2,482,602 | 9/1949 | Terpening . |
| 2,557,183 | 7/1951 | Gelles ................................. 280/47.34 |
| 2,594,501 | 4/1952 | Ruthman . |
| 2,738,034 | 3/1956 | Levine . |
| 3,061,049 | 10/1962 | Bramley .................................... 188/21 |
| 3,198,122 | 8/1965 | Lippke et al. . |
| 3,295,482 | 1/1967 | Dountas et al. . |
| 3,322,436 | 5/1967 | Musichuk . |
| 3,551,001 | 12/1970 | Wilson . |
| 3,679,233 | 7/1972 | Baker et al. . |
| 5,181,833 | 1/1993 | Villa et al. . |
| 5,382,138 | 1/1995 | Chilton . |
| 5,419,497 | 5/1995 | Warrington . |

*Primary Examiner*—Peter M. Poon
*Assistant Examiner*—C. J. Bartz
*Attorney, Agent, or Firm*—Reising, Ethington, Learman & McCulloch, PLLC

[57] ABSTRACT

A steerable three-wheeled cart has a frame supported by a pair on non-steerable rear wheels and a steerable front wheel. The front wheel is mounted on a steerable wheel carriage that is journaled to the frame for rotation of the carriage and wheel about a generally vertical axis. A handle is pivoted to the wheel carriage to effect steering of the front wheel. The handle mounts a braking member whose braking surface is curved both longitudinally and laterally so as to conform substantially to the curvature of the front wheel. A braking force is applied to the front wheel by rocking the handle downwardly to cause the braking member to bear against the wheel while retaining the ability to steer the wheel with the handle.

9 Claims, 2 Drawing Sheets

STEERABLE CART WITH HAND BRAKE

This invention relates to steerable cart constructions and more particularly to a three-wheeled cart having a manually operable brake.

BACKGROUND OF THE INVENTION

Various steerable three-wheeled carts have been proposed for transporting bulky or heavy loads. Examples include those disclosed in U.S. Pat. Nos. 1,876,788 and 3,295,482. In both examples, the carts include a frame mounting a pair of non-steerable back wheels and a steerable front wheel assembly coupled directly to a pivoting handle that, when moved laterally, imparts steering movement to the front wheel for steering the cart. Although highly maneuverable, such carts can be difficult to handle on uneven terrain such as when traveling down or along an inclined surface.

U.S. Pat. No. 3,551,001 discloses a four-wheeled cart having a frame supported on four castered wheels. A handle is pivoted to the front of the frame and mounts a pair of braking members that engage the front castered wheels when the handle is pivoted downward. Although such engagement of the front wheels by the braking mechanism slows the cart, it inherently disables the castering movement of the front wheels and thus renders the cart nonsteerable.

SUMMARY OF THE INVENTION

A steerable three-wheeled hand cart assembly includes a rigid cart frame having a pair of non-steerable rear wheels, a steerable front wheel and a carriage mounting the front wheel and supported rotatably by the cart frame for conjoint rotation of the carriage and front wheel about a generally vertical axis. A control handle is coupled pivotally to the wheel carriage to enable the cart to be pushed or pulled and to impart such conjoint rotation of the carriage and front wheel by lateral movement of the handle relative to the frame to control steering of the front wheel. A braking member is mounted on the handle in constantly aligned relation to the front wheel irrespective of its steered position in order to bear against and apply a braking force to the front wheel in response to pivoting the handle downwardly to a predetermined braking position while simultaneously retaining control of the steering of the front wheel by movement of the handle.

By coupling the control handle to the front wheel carriage and mounting the braking member on the handle in line with the front wheel, the invention achieves simultaneous braking and steering control of the cart, which is advantageous particularly when moving the cart along uneven terrain such as down or along an inclined surface.

According to a further feature of the invention, the braking member has a braking surface configured to complement both the circumferential and lateral curvature of the front wheel. The laterally curved shape of the front wheel minimizes its surface contact with the ground making it easier to roll and steer the wheel. The complemental shape of the braking member maximizes braking surface contact with the wheel, thereby minimizing the applied force required to achieve the desired braking. In addition, the full contact between the braking surface and the tire minimizes wear of the tire and that which occurs is generally uniform across the surface of the tire.

THE DRAWINGS

A presently preferred embodiment of the invention is illustrated in the accompanying drawings, wherein.

DETAILED DESCRIPTION

Figure 1:
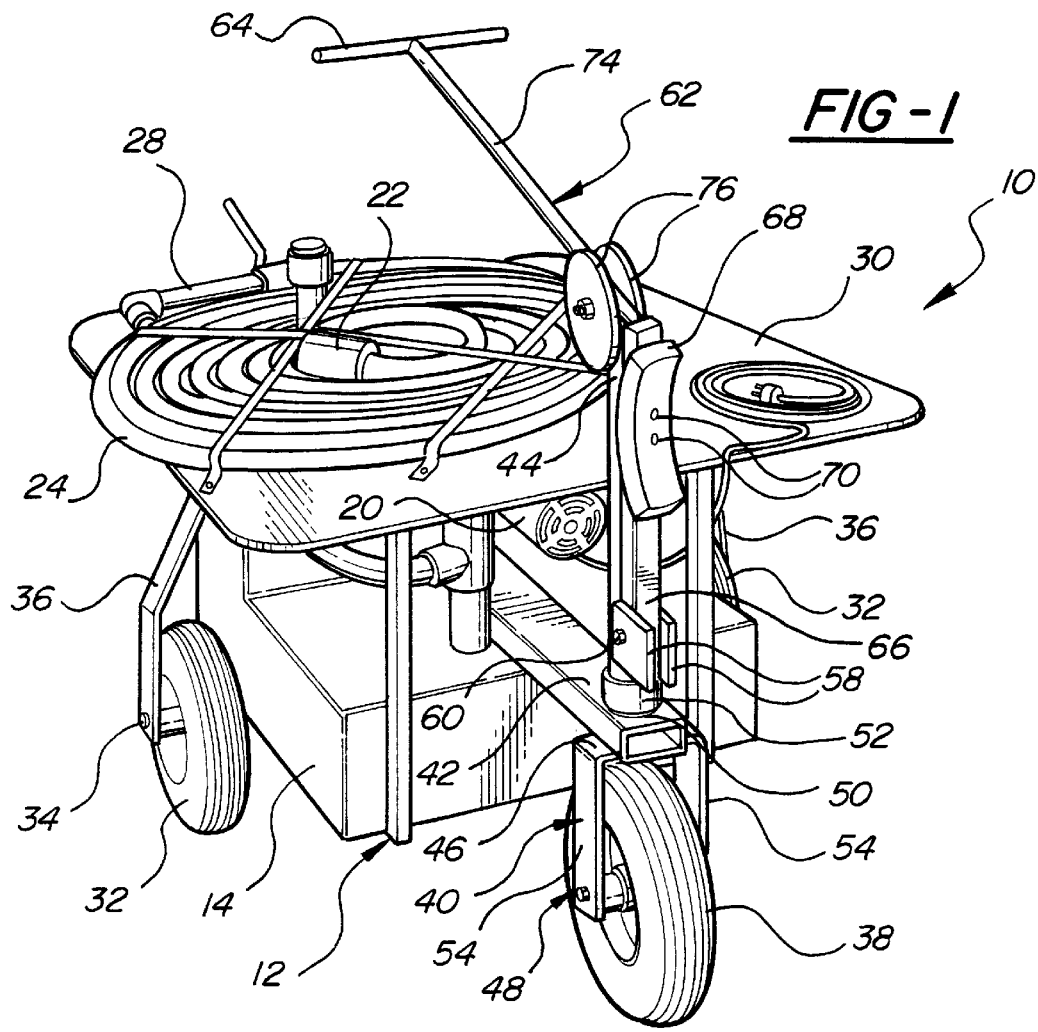
FIG. 1 is a frontal perspective view of a steerable three-wheeled cart showing the handle and brake pivoted upwardly.

A steerable three-wheeled hand cart constructed according to a presently preferred embodiment of the invention is designated generally at 10 in the drawings and comprises a rigid cart frame 12, which in the described example, mounts a generally L-shaped tank 14 provided with an inlet 16 at the top of the tank and an outlet 18 at the rear of the tank. The tank 14 supports a pump 20 having an inlet coupled by a valve assembly 22 to one end of a flexible hose 24, and an outlet 26 coupled to the inlet 16 of the tank 14. The free end of the hose 24 has a valve coupling 28 which may be connected to the outlet of the holding tank of a boat, recreational vehicle, or other device so as to enable the contents of the holding tank to be drawn via the pump 20 into the tank 14 of the cart 10 for subsequent discharge into a sewage system (not shown) via the outlet 18. Mounted on the frame 12 above the tank 14 is a platform 32 on which the hose 24 may be stored as shown when not in use.

A pair of non-steerable rear wheels 32 are mounted on the frame 12 adjacent its rear end by a common axle 34 that extends crosswise beneath the tank 14. A pair of supplemental support braces 36 extend out from the sides of the tank 14 and journal the free ends of the axle for added support.

The apparatus 10 also has a third (front) wheel 38 mounted by a steerable wheel carriage 40 to a forwardly projecting tongue 42 of the frame 12. The wheel 38 has a tire the ground engageable surface of what is curved transversely and circumferentially.

Figure 2:
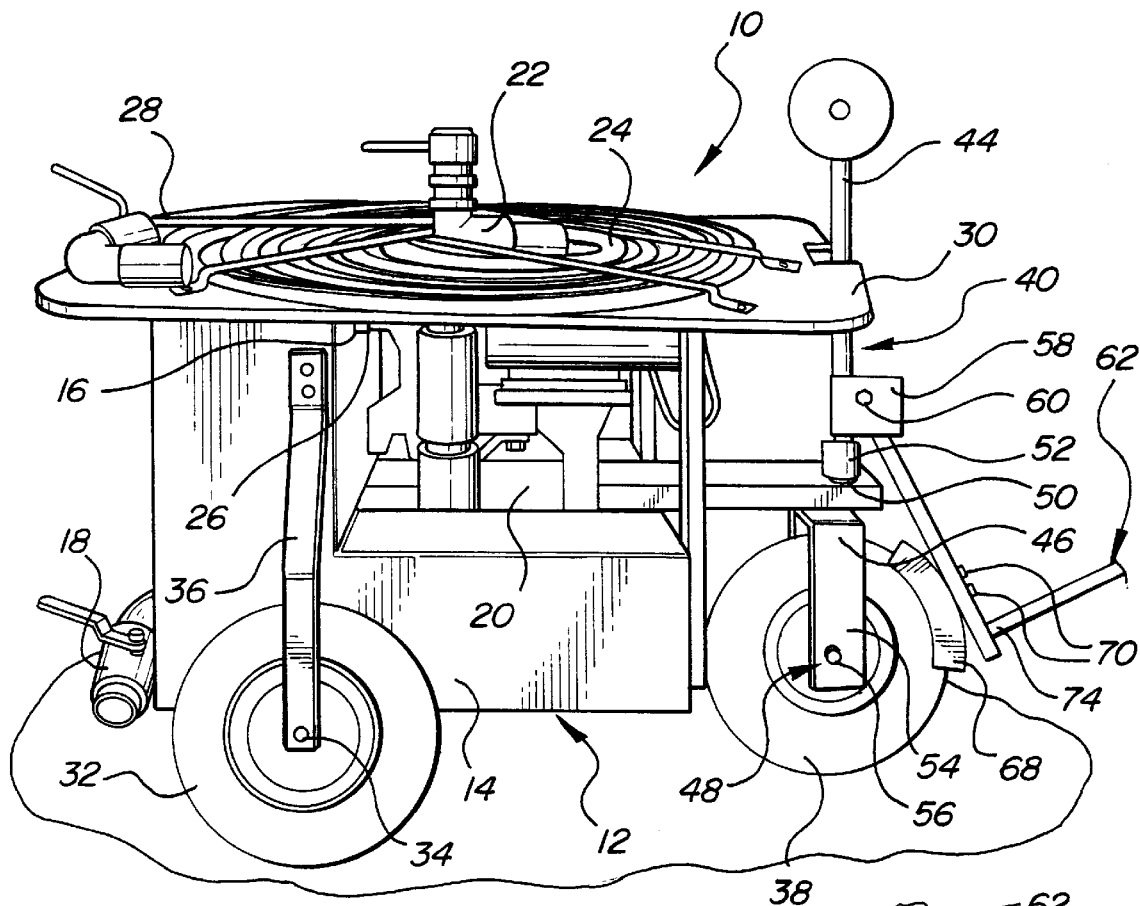
FIG. 2 is a side perspective view of the cart of FIG. 1 showing the handle and braking member pivoted downwardly into braking engagement with the front wheel.

The wheel carriage 40 includes a generally vertically extending spindle 44 fixed at its lower end to a horizontal cross piece 46 of a yoke or fork 48. The spindle 44 extends from the fork 48 upwardly through a bushing 50 of the tongue 42. A thrust washer (not shown) is provided between the fork 48 and the bottom of the tongue 42 and a top collar 52 is secured to the spindle 44 above the tongue 42 to secure the spindle 44 against vertical movement relative to the tongue 42. The fork 48 has laterally spaced arms 54 that depend vertically from the cross piece 46 and support adjacent their free ends a generally horizontal axle 56 on which the front wheel 38 is mounted. As shown in FIGS. 1 and 2, the front wheel 48 is supported along the central longitudinal axis of the frame 12 spaced midway between the rear wheels 32.

A pair of laterally spaced mounting plates 58 extend forwardly from the spindle 44 preferably at a location above the top collar 50. The plates 58 support a generally horizontally extending pivot pin 60 arranged parallel with the axle 56 of the front wheel 38. One end of a generally L-shaped control handle 62 is pivotally coupled by the pin 60 and plates 58 to the wheel carriage 40 enabling the handle 62 to pivot vertically about a horizontal axis in line with (i.e., in the plane of) the front wheel 38. The opposite free end of the handle 62 is provided with a cross bar 64 which can be gripped by a user. The inner walls of the mounting plates 58 confront the sides of the handle 62 to transmit lateral movement of the handle 62 into conjoint rotational steering movement of the carriage 40 and wheel 38 about the vertical axis of the spindle 44. In this way, the operator is able to have direct control over the steering of the front wheel 38 by simply moving the handle 62 to one side or the other of the cart frame 12.

The L-shaped handle 62 has a first leg section 66 nearest the mounting plates 58 that is of such length as to extend downwardly and forwardly to a free end overlying the front of the wheel 38 when the handle 62 is lowered as shown in FIG. 2. A braking member 68 is secured to the underside of the leg section 66 in such position as to engage the wheel 38 when the handle 62 is lowered to the braking position shown in FIG. 2. The braking member 68 may be fabricated from any of a number of materials such as wood, brake lining material, metal or the like which, when brought to bear against the wheel 38 provides sufficient frictional resistance to slow or stop the turning of the wheel 38.

Figure 4:
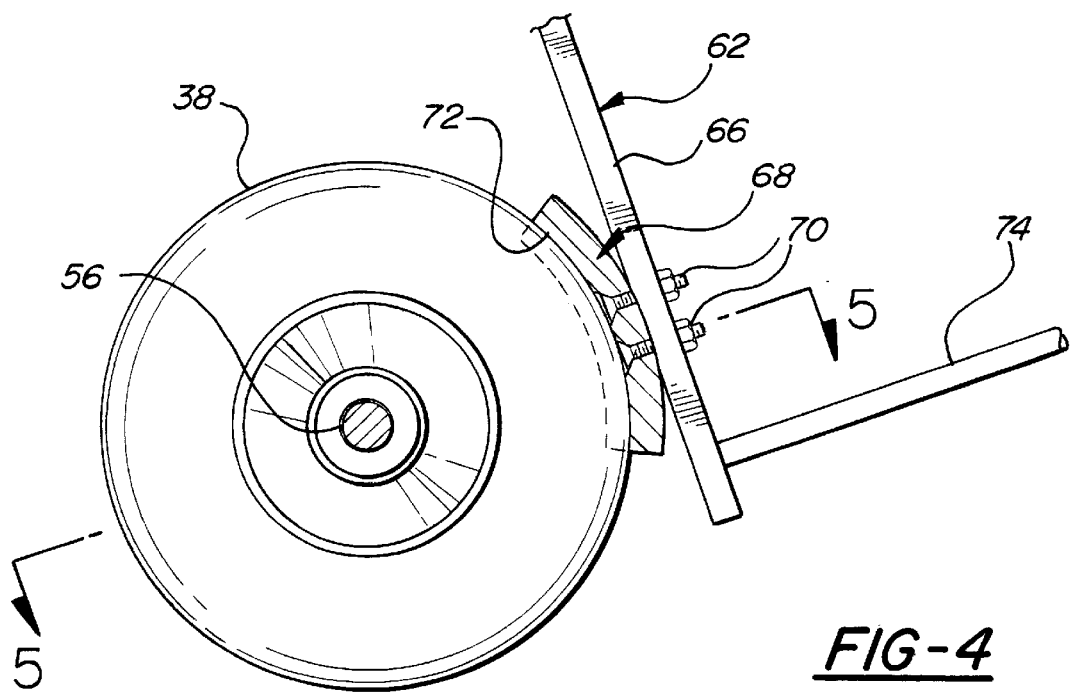
FIGS. 4 and 5 are diagrammatic sectional views illustrating the complemental curvature of the braking element and wheel.
Figure 3:
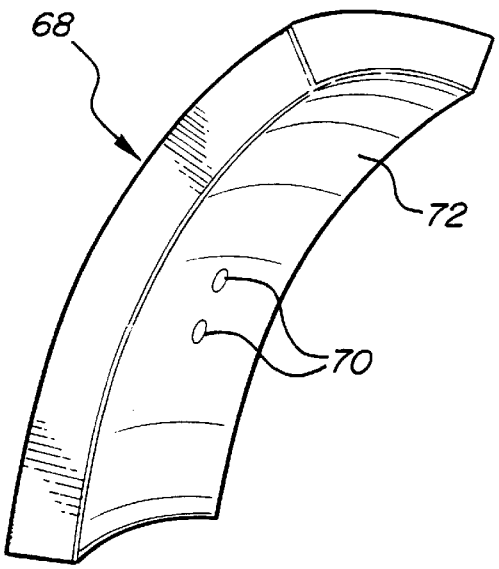
FIG. 3 is a perspective view of the braking element.
Figure 5:
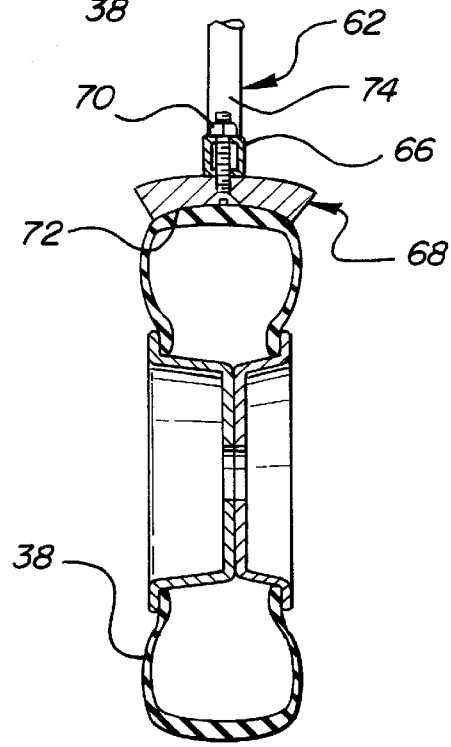

As shown best in FIGS. 3–5, the braking member 68 has a braking surface 72 that is curved both longitudinally and laterally of the member 68 so as to enable the braking surface 72 to conform substantially in configuration to the circumferential arc (FIG. 4) and lateral curvature (FIG. 9) of the surface of tire on the wheel 38 in order to maximize the contact area between the braking member 68 and the front wheel 38 and provide efficient braking of the front wheel 38.

The handle 62 includes a second leg section 74 that is secured to the free end of the first leg section 66 and extends therefrom forwardly and upwardly at an angle with respect to the first leg section 66 when the handle 62 is in the braking position. This angular relationship between the leg sections 66 and 74 locates the cross bar 64 at about knee level when in the braking position.

In use, an operator is able to move the cart about in a controlled manner simply by gripping the crossbar 64 and applying a pulling or pushing force to the handle 62. When gripping the cross bar 64 the operator naturally brings the bar 64 to about waist level which causes the braking member 68 to swing forwardly and upwardly clear of the wheel 38. The operator is able to steer the cart by simply moving the handle 62 to the left or right in the direction of turning. It will be appreciated that at all times, regardless of the steered position of the wheel 38, the handle 62 and braking member 68 remain in aligned relation to the wheel 38.

In the event the operator needs to slow the speed of the cart 10, such as when moving the cart across uneven terrain, the operator simply rocks the handle 62 downwardly to force the braking member 68 against the wheel 38. The amount of applied braking force is controlled by the amount of downward force applied to the handle 62. It will be appreciated that, while braking, the operator is able to maintain control over the steering of the front wheel 38 by lateral movement of the handle 62.

When not in use, the handle 62 can be swung upwardly and supported between retainers 76 provided at the top of the spindle 44 as illustrated in FIG. 1.

The disclosed embodiment is representative of a presently preferred form of the invention, but is intended to be illustrative rather than definitive thereof. The invention is defined in the claims.

I claim:

1. A steerable wheeled cart comprising:

a rigid cart frame;

a plurality of non-steerable wheels mounted on said frame adjacent one end thereof;

a steerable wheel;

a carriage mounting said steerable wheel on said frame for rotational steering movements about a generally vertical axis;

a control handle pivotally coupled to said carriage to impart steering movements to said steerable wheel by movement of said handle laterally relative to said frame; and a braking member mounted on said handle in constantly aligned relation to said steerable wheel for bearing against and applying a braking force to said steerable wheel in response to pivoting of said handle downwardly to a predetermined braking position while simultaneously retaining the ability of said handle to effect the steering movements of said steerable wheel, said carriage including a generally vertical spindle having forks at its lower end supporting said steerable wheel and extending generally vertically upwardly therefrom through a journalling support of said frame, said handle having a generally L-shaped configuration including a first leg portion extending sufficiently downwardly and forwardly of said spindle to position a free end thereof in forward overlying relation to said steerable wheel when said handle is moved to said braking position, and a second leg portion coupled to said free end of said first leg portion and extending forwardly and upwardly therefrom at an angle with respect to said first leg portion.

2. The cart of claim 1 wherein said steerable wheel has a ground engaging surface that is curved transversely and circumferentially of said steerable wheel, and wherein said braking member has a braking surface configured to complement both the circumferential and transverse curvature of said ground engaging surface to maximize surface contact between said braking member and said steerable wheel.

3. The cart of claim 1 wherein said braking element is mounted on said first leg portion adjacent said free end thereof.

4. A steerable three-wheeled cart comprising:

a rigid cart frame;

a pair of non-steerable rear wheels mounted rotatably on said frame;

a front wheel having an outer ground engaging surface that is curved both circumferentially and laterally of said front wheel;

a steerable wheel carriage mounting said front wheel and supported rotatably by said frame for conjoint rotational steering movements of said carriage and said front wheel about a generally vertical axis;

a control handle coupled pivotally to said wheel carriage to impart said rotational steering movements to said carriage and said front wheel by movement of said hangle laterally relative to said frame; and a braking member mounted on said handle having a braking surface positioned to bear against and apply a frictional braking force to said surface of said front wheel in response to pivoting of said handle downwardly to a predetermined braking position, said braking surface being configured to complement both the circumferential and lateral curvature of said surface of said front wheel to maximize surface contact between said braking member and said front wheel, said wheel carriage including a generally vertical spindle having forks at its lower end supporting said front wheel and extending generally vertically upwardly therefrom through a journalling support of said frame, said handle having a generally L-shaped configuration including a first leg portion extending sufficiently downwardly and forwardly of said spindle to position one end thereof in forward overlying relation to said front wheel when said handle is moved to said braking position, and a second leg portion coupled to said one end of said first leg portion and extending forwardly and upwardly therefrom at an angle with respect to said first leg potion.

5. The cart of claim 4 wherein said braking element is mounted on said first leg portion adjacent said one end thereof.

6. A wheeled cart having a frame provided with a plurality of wheels each of which has a ground-engageable surface, at least one of said wheels being steerable about a first substantially vertical axis; a control handle coupled to said steerable wheel for steering movements about said first axis and for rocking movements to and from a braking position about a second substantially horizontal axis, said control handle being operable to transmit pulling and pushing force to said frame and impart movement thereto; and a braking member carried by said handle for rocking movements therewith about both of said axes, said braking member having a braking surface movable into and out of braking engagement with said surface of said steerable wheel solely in response to rocking movements of said handle about said second axis in opposite directions to and from said braking position and regardless of the transverse angular position of said handle relative to said first axis.

7. A cart according to claim 6 wherein the ground engageable surface of said steerable wheel and the braking surface of said braking member are complementary.

8. A cart according to claim 7 wherein the ground engageable surface of said steerable wheel is arcuate transversely and circumferentially of said steerable wheel and wherein said braking surface of said braking member is correspondingly arcuate transversely and circumferentially of said braking member.

9. A cart according to claim 6 wherein said steerable wheel extends beyond one end of said frame and wherein said handle in one position of adjustment about said second axis extends beyond said one end of said frame and said braking member is vertically aligned with said steerable wheel.

* * * * *

UNITED STATES PATENT AND TRADEMARK OFFICE
CERTIFICATE OF CORRECTION

PATENT NO. : 5,868,407
DATED : February 9, 1999
INVENTOR(S) : William C. Roese

It is certified that error appears in the above-indentified patent and that said Letters Patent is hereby corrected as shown below:

Column 2, line 38, Change "what" to -- which --.

Signed and Sealed this

Seventeenth Day of August, 1999

Attest:

Q. TODD DICKINSON

Attesting Officer

Acting Commissioner of Patents and Trademarks